July 5, 1932. F. M. REID 1,866,055
TANK VEHICLE FRAME CONSTRUCTION
Filed July 5, 1929 2 Sheets-Sheet 2
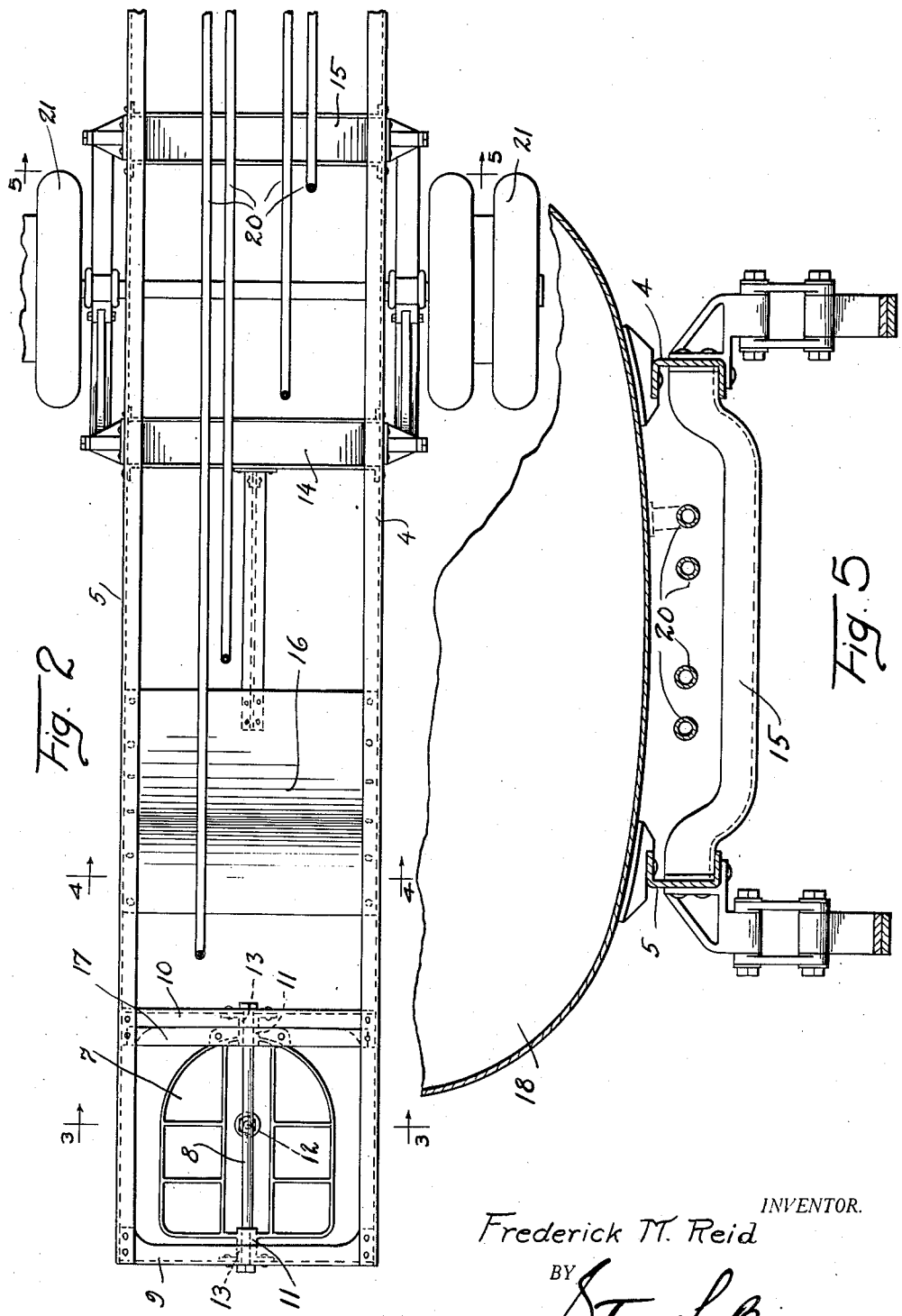
INVENTOR.
Frederick M. Reid
BY
ATTORNEY.

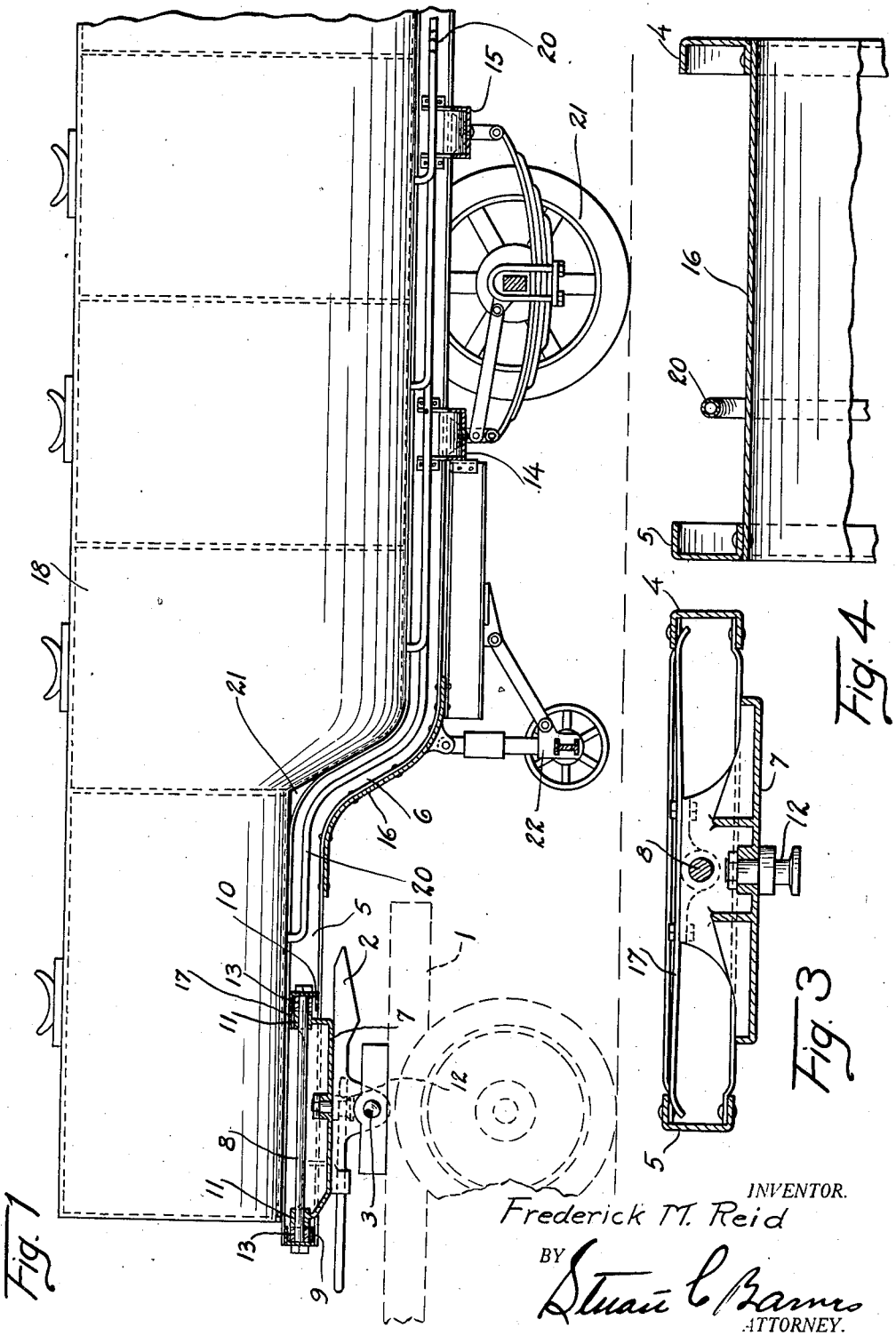

Patented July 5, 1932

1,866,055

UNITED STATES PATENT OFFICE

FREDERICK M. REID, OF DETROIT, MICHIGAN, ASSIGNOR TO FRUEHAUF TRAILER COMPANY, OF DETROIT, MICHIGAN, A CORPORATION OF MICHIGAN

TANK VEHICLE FRAME CONSTRUCTION

Application filed July 5, 1929. Serial No. 376,061.

The invention relates to a vehicle frame construction, and has to do particularly with a frame construction especially designed for carrying tanks such as the commonly noticed oil and gasoline delivering tank trucks. More especially the invention is directed to a frame construction of a semi-trailer which is attached and partially supported by a separate tractor and wherein the semi-trailer is in itself the tank unit having a tank more or less permanently carried by the semi-trailer frame.

Specifically, the invention is concerned with a semi-trailer which embodies the so-called drop frame construction, which involves a drop or offset in the trailer frame thus providing one part which is relatively high for resting upon the tractor, and another relatively low part which carries the bulk of the load. The tank is carried by both of these mentioned portions of frame, and while the main body portion of the tank which is disposed on a low portion of the frame is generally oval in cross section, the forward portion of the tank which overlies the more elevated part of the frame is considerably flattened on its bottom. This results in a rather weakened part of the tank, and it is an object of this invention to so provide the frame structure as to make it extremely rigid so that strains will not be communicated to the tank, and in this connection a rockable joint is preferably used between the trailer and the tractor to permit movements in all directions relative to the tractor and trailer when moving over a highway. Moreover, tanks of this nature are usually divided into sections and each section or compartment has its own outlet. This trailer frame construction, while involving a particularly strong frame, is arranged so that the cross members of the frame do not interfere with the space between the main frame members so that this space can be utilized for the several outlets or conduits which extend to the rear of the vehicle for dispensing the oil or gasoline or other fluid.

In the accompanying drawings:—

Fig. 1 is a view illustrating the semi-trailer of this invention in section showing the tank thereof in side elevation, and also illustrating the rear end of a tractor with which the semi-trailer is associated.

Fig. 2 is a top plan view of the trailer-frame construction.

Fig. 3 is a section through the upper fifth wheel of the semi-trailer taken on line 3—3 of Fig. 2.

Fig. 4 is a section taken on line 4—4 of Fig. 2, illustrating the re-enforced construction of the trailer.

Fig. 5 is a partial sectional view taken substantially on line 5—5 of Fig. 2.

The tractor frame is illustrated at 1, and the same is shown as being provided with a lower fifth wheel 2. This fifth wheel may advantageously be of the rearwardly tilting type as is well-known by those skilled in the art, the same being pivotally mounted on the tractor as at 3. It may or may not be secured to the tractor frame with an association of springs to absorb shocks; although preferably springs are used, but they are not shown herein as it forms no essential part of this invention.

The trailer frame comprises longitudinally extending frame members or side rails 4 and 5 which may be of the usual channel construction as shown in Fig. 4. These frame members are offset as at 6 thus to form the drop frame construction. The forward end of the frame is equipped with the upper half of the fifth wheel for association with the lower half of the fifth wheel mounted on the tractor. This fifth wheel is in the form of a plate like member 7 which may be a casting and it is mounted on the trailer frame so that it can rock with respect to the frame. For this purpose there is a longitudinally extending bar or swivel member 8 secured to the trailer frame at one end to a forward cross member 9 of the frame and at its other end to another cross member 10. The upper fifth wheel member has bearing members 11 through which this rod extends. Thus the upper fifth wheel member can rock with respect to the trailer frame on the horizontal pivot extending longitudinally of the frame. The fifth wheel member has a depending king pin 12 arranged to be detachably connected to the lower fifth wheel mounted on the tractor. Supporting brackets 13 are used for lending strength to the mounting of the bar 8.

For the purpose of holding the upper fifth wheel normally in a horizontal plane, a spring 17 is provided which is secured to the upper fifth wheel member as shown in Fig. 3 and which has ends which engage the frame members 4 and 5 as shown in Fig. 3. It will thus be observed that this spring arrangement holds the upper fifth wheel in a horizontal position while the same is detached from the tractor but the spring will permit rocking of the upper fifth wheel member during tractor and trailer operations.

To the rear of the trailer there are other cross members connecting the side rails 4 and 5. These cross members are shown at 14 and 15 advantageously of channel form having flanged out portions for attachment to the side rails. As shown in Fig. 5 the member 15 is offset or dropped down centrally. The cross member 14 may be identical with the cross member 15.

At the offset construction of the trailer frame a structure is utilized which is particularly simple, yet which lends strength to the trailer frame in several different ways: strength is given to the trailer frame against twisting strains and also against longitudinal and vertical forces. Specifically, this re-enforced construction takes the form of a plate 16 of suitable thickness and strength. This plate is given a shape corresponding to the shape of the frame and extends entirely across from one frame member to the other (Figs. 2 and 4). This plate is secured to the frame members in any suitable manner by means of rivets as shown.

The tank, for association with this trailer frame, is shown at 18, the same being shaped so that its forward end is relatively small in cross section and its rear end larger, thus to correspond to the drop frame construction. This tank is divided into compartments as shown and each compartment has an outlet conduit, the conduits being shown at 20, which extend to the rear of the trailer and each conduit is provided with a suitable fixture (not shown) for dispensing of the liquid contents.

The rear end of the trailer is supported by a running gear having wheels 21 and adjacent the forward end is a supporting structure 22. This supporting structure is designed to support the forward end of the semi-trailer when the same is detached from the tractor and it is also preferably arranged to be folded up out of the way during combined use of the tractor and trailer. As this supporting structure is shown in Fig. 1, it is in the position it assumes when supporting the forward end of the trailer, the same being lifted up from the ground due to the fact that the forward end of the trailer is secured to the tractor but it is designed to be further folded up during combined tractor and trailer use.

It will be observed that appreciable space is provided underneath the tank for accommodating the several outlet conduits as is particularly well shown in Fig. 5. This is effected by reason of the particular formation of the frame cross members. The cross supports 14 and 15 are depressed centrally so as to provide space. Also the plate 16 does not interfere with the works so that all conduits may lie immediately under the tank and yet may be deposed within the boundaries of the frame so as to be protected thereby. In other words, the conduits are preferably located above the lower edge of the frame members.

The rear portion of the tank is relatively large and of full oval shape in cross section, while the front portion is materially flattened on its bottom side. Accordingly, a tank of this nature is relatively weak substantially at the point 21 and any strains are liable to rupture a seam or otherwise break the tank. However, the frame construction of the vehicle is rendered especially strong at this point so as to take all of the strains. The plate 16 being of a relatively great length is very effective in preventing relative longitudinal movement of the frame members, thus to take twisting strains in the frame: due to its offset shape, the plate also has vertical strength and strength in a longitudinal direction. Accordingly, the frame at this point is adequately re-enforced but at the same time the re-enforcements do not interfere with the space provided for the outlet conduit or conduits extending therethrough; moreover, the plate acts as a shield at this point, in that it keeps out the dust and dirt and protects this portion of the tank from stones which may be thrown by the adjacent wheels of the tractor.

Moreover, there is a universal coupling provided between the trailer and the tractor in that the upper fifth wheel member is mounted to swivel on the longitudinally extending bar 8 and the lower fifth wheel member rocks as at 3. Thus full range of relative movements are provided between the tractor and the trailer which further eliminates strains on the trailer frame.

Claims:

1. In a semi-trailer frame construction, longitudinally extending frame members provided with an offset whereby the frame has a relatively high portion and a relatively low portion, and a re-enforcement for the frame at the offset comprising a plate having a shape corresponding to the offset portion of the frame members and extending across the frame construction from one frame member to the other and secured to both, said plate having a length sufficient to close the space between the frame members substantially from top to bottom of the offset.

2. In a semi-trailer frame construction adapted to carry a tank, side rails each provided with an offset to form a drop frame construction, and a frame re-inforcing and tank protecting plate connecting the side rails at the offset portion, said plate having a shape corresponding to the offset and being relatively long so as to connect the side rails at the offset and at horizontal portions on each side of the offset.

3. In a semi-trailer frame construction adapted to carry a tank, side rails each provided with two bends and each having a section between the bends disposed at an angle to the vertical to provide a drop frame construction, a single frame re-inforcing and tank protecting plate extending across the frame and being connected to both rails, said plate being connected to said rails at the horizontal portions on each side of the said angularly extending portion and also connected to the angularly extending portions, said plate having a shape which corresponds to the bends and angular portions of the side rails.

4. In a semi-trailer frame construction, the combination of offset side rails for the frame which provides a drop frame construction, a tank carried by the frame having its bottom in a plane relatively close to the plane of the tops of the side rails, said tank being divided into compartments, a frame cross member connecting the side rails which is depressed downwardly away from the bottom of the tank to provide an unobstructed space underneath the tank, and a conduit from each compartment of the tank lying in said space and extending to the rear of the trailer.

5. In a semi-trailer frame construction, the combination of offset side rails for the frame which provides a drop frame construction, a tank carried by the frame having its bottom in a plane which substantially coincides with the plane of the tops of the side rails, said tank being divided into compartments, frame cross members connecting the side rails which are depressed downwardly away from the bottom of the tank to provide an unobstructed space underneath the tank, and a conduit from each compartment of the tank lying in said space and extending to the rear of the trailer, said conduits being disposed between the upper and lower edges of the frame side members to be protected thereby.

6. In a semi-trailer, offset side rails to provide the drop frame construction, a tank on the frame which is divided into compartments having its bottom in a plane which substantially coincides with the plane of the tops of the side rails, outlet conduits from each compartment, said conduits extending to the rear of the trailer and being located below the tank but above the lower edge of the side rails, frame cross members connecting the side rails which are depressed away from the tank to permit location of the pipes as above mentioned, and a relatively long plate connecting the side rails at the offset, said plate being positioned to provide a space between the tank and plate to provide a passage for the conduits and also serving to re-enforce the frame construction and as a protection to the adjacent part of the tank.

7. The combination with a trailer frame having offset rails to provide a drop frame construction, of a tank carried by the side rails having a portion relatively large in cross section on one side of the offset and a portion relatively small in cross section on the opposite side of the offset, and a double curved plate connecting the side rails at the offset and beyond the offset in both directions to re-enforce the frame at this point against strains whereby to protect the relatively weak point in the tank where the two portions of varied cross section connect and forming a protecting apron closing the space between the side rails.

In testimony whereof I affix my signature.
FREDERICK M. REID.